(12) United States Patent
Kuboniwa

(10) Patent No.: US 9,855,717 B2
(45) Date of Patent: Jan. 2, 2018

(54) VACUUM THERMAL INSULATION MATERIAL TECHNICAL FIELD

(71) Applicant: MAG-ISOVER K.K., Tokyo (JP)

(72) Inventor: Seiichi Kuboniwa, Tokyo (JP)

(73) Assignee: MAG-ISOVER K.K., Tokyo (JP)

( * ) Notice: Subject to any disclaimer, the term of this patent is extended or adjusted under 35 U.S.C. 154(b) by 15 days.

(21) Appl. No.: 14/769,950

(22) PCT Filed: Feb. 26, 2014

(86) PCT No.: PCT/JP2014/054755
§ 371 (c)(1),
(2) Date: Aug. 24, 2015

(87) PCT Pub. No.: WO2014/133037
PCT Pub. Date: Sep. 4, 2014

(65) Prior Publication Data
US 2016/0009047 A1    Jan. 14, 2016

(30) Foreign Application Priority Data

Feb. 26, 2013    (JP) .................................. 2013-036455

(51) Int. Cl.
*F16L 59/065*    (2006.01)
*B32B 3/04*    (2006.01)
(Continued)

(52) U.S. Cl.
CPC .............. *B32B 3/04* (2013.01); *B32B 27/306* (2013.01); *B60R 13/0212* (2013.01);
(Continued)

(58) Field of Classification Search
CPC ........................... Y10T 428/231; F16L 59/065
(Continued)

(56) References Cited

U.S. PATENT DOCUMENTS 4,590,131 A * 5/1986 Yazaki .................... C08L 23/08
    428/36.6
5,623,795 A * 4/1997 Padgett, Jr. ............. E04F 11/06
    182/47
(Continued)

FOREIGN PATENT DOCUMENTS

EP    1 617 126 A1    1/2006
EP    1 647 759 A2    4/2006
(Continued)

OTHER PUBLICATIONS

International Search Report from PCT/JP2014/054755, dated May 20, 2014 (English).

*Primary Examiner* — Alexander Thomas
(74) *Attorney, Agent, or Firm* — Buchanan, Ingersoll & Rooney PC

(57) ABSTRACT

Provided is a vacuum thermal insulation material which is capable of maintaining a vacuum for a long period of time in a high temperature range. The present invention relates to a vacuum thermal insulation material which comprises a core material and an envelope in which the core material is sealed. The envelope comprises thermal fusion bonding layers, and the thermal fusion bonding layers that face each other at an end portion of the envelope are thermally fused to each other, thereby forming a sealed portion. The core material has a first main flat surface that is exposed to the relatively high temperature side when in use and a second main flat surface that faces the first main flat surface and is exposed to the relatively low temperature side when in use. At least a part of the sealed portion is arranged on the second main flat surface side.

13 Claims, 4 Drawing Sheets

(51) Int. Cl.
  *B60R 13/02* (2006.01)
  *B32B 27/30* (2006.01)

(52) U.S. Cl.
  CPC ....... *F16L 59/065* (2013.01); *B32B 2262/101* (2013.01); *B32B 2307/304* (2013.01); *B32B 2307/31* (2013.01); *B32B 2419/06* (2013.01); *B32B 2605/08* (2013.01)

(58) Field of Classification Search
  USPC .......................................................... 428/69
  See application file for complete search history.

(56) References Cited

U.S. PATENT DOCUMENTS

| | | | | |
|---|---|---|---|---|
| 7,537,817 | B2* | 5/2009 | Tsunetsugu | E04B 1/803 428/69 |
| 2003/0157284 | A1* | 8/2003 | Tanimoto | B65D 81/18 428/36.1 |
| 2005/0235682 | A1* | 10/2005 | Hirai | F25D 23/062 62/440 |
| 2006/0088685 | A1* | 4/2006 | Echigoya | F16L 59/065 428/69 |

FOREIGN PATENT DOCUMENTS

| | | |
|---|---|---|
| JP | 11-201377 A | 7/1999 |
| JP | 11-210983 A | 8/1999 |
| JP | 2007-283989 A | 11/2007 |
| JP | 2007283989 A | 11/2007 |
| JP | 2011-058538 A | 3/2011 |
| JP | 2011058538 A | 3/2011 |
| JP | 2012-026512 A | 2/2012 |
| JP | 2012026512 A | 2/2012 |
| JP | 2012-057838 A | 3/2012 |
| JP | 2012-102894 A | 5/2012 |
| JP | 2012102894 A | 5/2012 |
| JP | 2012-163258 A | 8/2012 |
| JP | 2012163258 A | 8/2012 |

* cited by examiner

VACUUM THERMAL INSULATION MATERIAL TECHNICAL FIELD

CROSS-REFERENCE TO RELATED APPLICATIONS

The present application is a U.S. National Phase of International Patent Application No. PCT/JP2014/054755, filed on Feb. 26, 2014, and claims priority to Japanese Patent Application No. JP 2013-036455, filed on Feb. 26, 2013, each, including all disclosures and specifications, are hereby expressly incorporated herein in their entirety by reference thereto.

TECHNICAL FIELD

The present invention relates to a vacuum thermal insulation material. More particularly, the present invention relates to a vacuum thermal insulation material that is capable of maintaining a vacuum for a long period of time in a high temperature range.

BACKGROUND ART

Typically in the case of using a vacuum thermal insulation material, a core material composed of glass wool is inserted into an envelope comprising a plurality of layers. After drawing a vacuum inside, the envelope is sealed by heating and melting the insertion opening, so as to prevent the vacuum from being broken by external factors and maintain the vacuum over a long period of time. The envelope is normally composed of a laminate obtained by layering a hot-melt layer, barrier layer and protective layer in that order starting from the inside. For example, Patent Document 1 discloses an envelope composed of a laminate comprising an outside hot-melt layer, a barrier layer, internal protective layer and external protective layer in this order. In addition, Patent Document 2 discloses a vacuum thermal insulation material further comprising a film on the outside, while Patent Document 3 discloses a vacuum thermal insulation material further comprising a second hot-melt portion which is formed on the outside of a hot-melt sealed portion.

The use of such vacuum thermal insulation materials as insulating materials that enhance energy-saving effects for the purpose of preventing global warming caused by carbon dioxide gas emissions has become increasingly popular in home appliances, and particularly refrigerators, and in recent years, these materials have been commercialized for use in applications other than refrigerators, such as bathtubs and bathtub covers in the field of housing equipment as well as the outer insulation of residential house walls.

In these applications, the vacuum thermal insulation materials are used at normal temperature or in a temperature range slightly higher than normal temperature. In the case of refrigerators, for example, vacuum thermal insulation materials are exposed to the temperature inside the refrigerator and the temperature outside the refrigerator. In the case of bathtubs, since vacuum thermal insulation materials are used on the insides of plastic bathtubs, the temperature to which vacuum thermal insulation materials are exposed is predicted to be lower than the hot water temperature, which is generally 42° C. or lower. In the case of residential house walls as well vacuum thermal insulation materials are exposed to temperatures generally up to about 40° C. even during the summer months, although varying according to orientation and location.

Although the use of such vacuum thermal insulation materials has increased in comparatively low temperature ranges, their use has not increased at high temperatures (ranging from higher than 60° C. to about 100° C.). In the case of automobiles, for example, since the temperature of an automobile roof is said to reach nearly 100° C. in the summer, residential house roofs are said to reach a temperature of about 60° C. in the summer and the temperature of hot water in hot water tanks is about 90° C., the use of vacuum thermal insulation materials in such applications is limited.

The reason why vacuum thermal insulation materials are not widely used at high temperatures is due to the considerable deterioration of insulating performance of the vacuum thermal insulation material at temperatures exceeding 40° C. Although an invention has been disclosed in which another material is inserted between a hot water tank and a vacuum thermal insulation material in order to reduce deterioration of the performance of the vacuum thermal insulation material caused by heat, deterioration of insulating performance of the vacuum thermal insulation material at high temperatures is unable to be prevented in this invention. Although the use of an extremely high-performance adsorbent is effective in inhibiting deterioration of insulating performance even in conventional vacuum thermal insulation materials, these adsorbents are extremely expensive and difficult to acquire. Although patent applications have been filed for use in automobiles or hot water tanks and the like in the manner of Patent Documents 4 and 5, vacuum thermal insulation materials capable of maintaining a vacuum at high temperatures still have room for improvement.

PRIOR ART DOCUMENTS

Patent Documents

Patent Document 1: Japanese Unexamined Patent Publication No. 2012-026512
Patent Document 2: Japanese Unexamined Patent Publication No. H11-201377
Patent Document 3: Japanese Unexamined Patent Publication No. H11-210983
Patent Document 4: Japanese Unexamined Patent Publication No. 2007-283989
Patent Document 5: Japanese Unexamined Patent Publication No. 2012-163258

DISCLOSURE OF THE INVENTION

Problems to be Solved by the Invention

Therefore, an object of the present invention is to provide a vacuum thermal insulation material capable of maintaining a vacuum for a long period of time in a high temperature range.

Means for Solving the Problems

The inventors of the present invention found that, in the case of using a vacuum thermal insulation material in a high temperature range, the vacuum of the vacuum thermal insulation material easily broken at the sealed portion thereof, and that the rate at which the vacuum is broken increases rapidly as a result of the sealed portion reaching a high temperature. The inventors of the present invention also found that, in the case of using a vacuum thermal insulation material in a high temperature range, vacuum break attributable to heating of the sealed portion can be prevented by locating the position of the sealed portion on the low temperature side of the vacuum thermal insulation material, and that vacuum can be maintained over an extremely long period of time as a result thereof, thereby leading to completion of the present invention. Namely, the present invention is as indicated below.

[1] A vacuum thermal insulation material having a core material and an envelope in which the core material is inserted, wherein:

the envelope comprises a hot-melt layer, and the hot-melt layer at an end portion thereof is thermally fused to each other, thereby forming a sealed portion, the core material has a first main flat surface exposed to the relatively high temperature side when in use, and a second main flat surface that faces the first main flat surface and is exposed to the relatively low temperature side when in use, and at least a portion of the sealed portion is positioned on the second main flat surface side.

[2] The vacuum thermal insulation material described in [1], wherein the envelope is positioned on the second main flat surface side by being folded back at the end surface of the core material, and the length of the folded portion of the envelope is 10 mm to 100 mm starting from the end surface of the core material.

[3] The vacuum thermal insulation material described in [1] or [2], wherein the entire sealed portion is positioned on the second main flat surface side.

[4] The vacuum thermal insulation material described in any of [1] to [3], wherein a plurality of sealed portions are formed in the envelope, and all of the plurality of sealed portions are positioned on the second main flat surface side.

[5] The vacuum thermal insulation material described in any of [1] to [4], wherein mutually different indications and/or coloring are present on the first main flat surface and the second main flat surface.

[6] The vacuum thermal insulation material described in any of [1] to [5], wherein the core material is a glass wool molding.

[7] The vacuum thermal insulation material described in any of [1] to [6] above, wherein the hot-melt layer comprises an ethylene-vinyl alcohol copolymer resin.

[8] The vacuum thermal insulation material described in [7], wherein the ethylene-vinyl alcohol copolymer resin has a melting point of 150° C. or higher.

[9] The vacuum thermal insulation material described in [7] or [8], wherein the ethylene content of the ethylene-vinyl alcohol copolymer resin is 10 mol % to 60 mol %.

[10] The vacuum thermal insulation material described in any of [1] to [9], wherein the first main flat surface is exposed to a temperature of 40° C. or higher when in use.

[11] The vacuum thermal insulation material described in [10], wherein the first main flat surface is exposed to a temperature of 60° C. or higher when in use.

[12] The vacuum thermal insulation material described in any of [1] to [11], which is for use in an automobile, residential house roof or hot water tank.

Effects of the Invention

The vacuum thermal insulation material of the present invention is capable of maintaining a vacuum over an extremely long period of time even when used in a high temperature range. In addition, the vacuum thermal insulation material of the present invention enables the thickness of the vacuum thermal insulation material to be reduced since it is capable of maintaining a vacuum over a long period of time.

EMBODIMENTS FOR CARRYING OUT THE INVENTION

Figure 1:
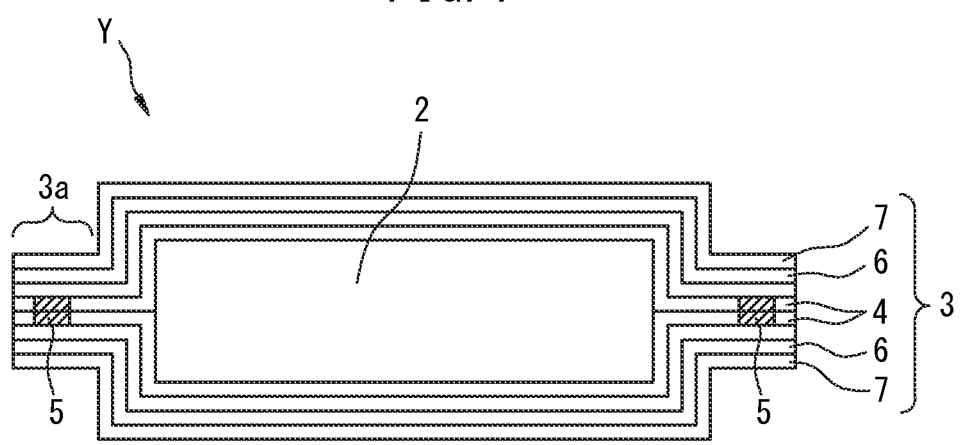
FIG. 1 is a perspective view of an ordinary vacuum thermal insulation material.

The vacuum thermal insulation material of the present invention has a core material and an envelope in which the core material is inserted, the envelope comprises a hot-melt layer, and the hot-melt layer at an end portion thereof is thermally fused to each other, thereby forming a sealed portion. The core material has a first main flat surface that is exposed to the relatively high temperature side when in use and a second main flat surface that faces the first main flat surface and is exposed to the relatively low temperature side when in use, and at least a portion of the sealed portion is positioned on the second main flat surface.

Normally, a vacuum thermal insulation material is put into a vacuum state by sealing a core material in an envelope and evacuating air from inside the envelope. For example, a hot-melt layer of the envelope is laminated in mutual opposition followed by forming a sealed portion by thermally fusing three of the edges while excluding one end serving as an opening to form the envelope into the form of a pouch. Subsequently, a core material is placed inside the envelop through the opening in the pouch-like envelope, and after adhering the envelope to the core material by drawing a vacuum inside the envelope, the opening is thermally fused to form a sealed portion and obtain a vacuum thermal insulation material.

In one aspect of the present invention, the envelope having sealed portions formed on both ends is longer than the core material and forms fin portions, and the fin portions of the envelope are folded back at the end surface of the core material. Here, at least a portion of the sealed portion is positioned on the low temperature side of the vacuum thermal insulation material. Namely, when using the vacuum thermal insulation material, in the case the surface of the core material on the side where the vacuum thermal insulation material is exposed to a high temperature is defined as a first main flat surface side and the surface on the opposite side opposing this surface is defined as a second main flat surface side, then at least a portion of the sealed portion is positioned on the second main flat surface side. Preferably the entire sealed portion is positioned on the second main flat surface side. A plurality of sealed portions may be formed at fin portions of the envelope, and more preferably, all of the plurality of sealed portions are positioned on the second main flat surface side. As a result thereof, vacuum break attributable heating of the sealed portions can be prevented and vacuum can be maintained over an extremely long period of time even if the vacuum thermal insulation material is used in a high temperature range. Here, high temperature refers to a temperature of 40° C. or higher, 50° C. or higher, 60° C. or higher, 70° C. or higher or 100° C. or higher. In addition, the relatively high temperature side refers to the side on the opposite side from the relatively low temperature side that reaches the highest temperature during use. Namely, in the case of an automobile, although the exterior side becomes hot in the summer due to high outside temperatures and sunlight while the interior is warmed in the winter by the heater inside the automobile, in such cases as well, the high temperature side that reaches the highest temperature is the exterior side of the automobile.

In one aspect of the present invention, the length of a folded portion of the envelope, which is formed by folding back a fin of the envelope at the end surface of the core material, is within the range of 10 mm to 100 mm starting from the end surface of the core material. If this length is adequate, it is difficult for heat to transfer to the sealed portion, while if this length is equal to or less than the aforementioned range, heat insulating properties do not deteriorate very much, which is a result of an increase in the envelope length. This envelope folded portion may be fixed at least partially with an adhesive and the like, or the envelope folded portion can be fixed on the second main flat surface by wrapping the entire envelope with another material. The length of the folded portion of the envelope is preferably 15 mm or more and more preferably 20 mm or more. In addition, the length of the folded portion of the envelope is preferably 80 mm or less and more preferably 50 mm or less.

Mutually different indications and/or coloring can be provided on the surfaces of the first main flat surface side and second main flat surface side of the vacuum thermal insulation material to facilitate differentiation during installation. For example, an indication to the effect that the first main flat surface is used on the high temperature side and/or an indication to the effect that the second main flat surface is used on the low temperature side are preferably provided.

More specifically, different indications can be provided by indicating different marks or different colors on the first main flat surface and second main flat surface of the vacuum thermal insulation member. In addition, in the case of a vacuum thermal insulation material for automobile use or residential use, an indication can be provided on the second main flat surface side to the effect that it is used on the interior side and/or an indication can be provided on the first main flat surface side to the effect that it is used on the exterior side. In the case of a vacuum thermal insulation material for a hot water tank, an indication can be provided on the second main flat surface side that it is used on the outside, while an indication can be provided on the first main flat surface side that it is used on inside. Furthermore, examples of actual indications include, but are not limited to, "high temperature side", "low temperature side", "high temperature", "low temperature", "high", "low", "interior side", "exterior side", "inside", "outside", "inner" and "outer".

<Core Material>

There are no particular limitations on the core material used in the vacuum thermal insulation material of the present invention provided it has insulating properties. Although examples of the core material include pearlite powder, silica powder, precipitated silica powder, diatomaceous earth, calcium silicate, glass wool, stone wool and foamed resins (such as foamed styrene or foamed urethane), glass wool is used preferably and a glass wool molding is used more preferably. In addition, hollow vessels or honeycomb structures made of resin or inorganic materials may also be used.

An example of the glass wool molding preferably used in the present invention is a structure having a three-dimensional framework in which the intersecting portions of the fibers are joined with an inorganic binder such as an aqueous sodium silicate solution as obtained according to the method described in Japanese Patent No 3712129. The fiber diameter of the glass wool is preferably 2 μm to 8 μm and more preferably 3 μm to 5 μm. If the fiber diameter is 2 μm or more, the energy consumption rate required for fiber formation is preferable, while if the fiber diameter is 8 μm or less, thermal conductivity during fiber formation is within a preferable range. The density of the glass wool molding is preferably 50 kg/m$^3$. to 300 kg/m$^3$ and more preferably 60 kg/m$^3$ to 100 kg/m$^3$. The thickness of the glass wool molding is preferably 5 mm to 30 mm and more preferably 10 mm to 20 mm. In the case the thickness of glass wool molding is large, it is difficult for internal pressure to rise in response to a corresponding increase in volume even if a gas flows into the vacuum thermal insulation material, thereby making this preferable, while in the case the thickness is small, handling becomes easy, thereby making this preferable.

The vacuum thermal insulation material may also contain an adsorbent or getter that adsorbs water vapor or gas and the like within the envelope together with the core material. Examples thereof include physical adsorbents such as zeolite, activated charcoal, activated alumina, silica gel, dawsonite or hydrotalcite, and chemical adsorbents such as alkaline metals, alkaline earth metals, oxides thereof and hydroxides thereof.

<Envelope>

The envelope normally comprises a hot-melt layer, a barrier layer and a protective layer, and forms a sealed portion by mutually thermally fusing the hot-melt layer that faces each other at an end portion thereof, thereby sealing the core material inside. Each of the layers can be mutually adhered with adhesive layers. In addition, an adsorbent or desiccant and the like can be contained between and/or within each layer.

Although examples of the hot-melt layer includes polyolefin resins such as linear low-density polyethylene, high-density polyethylene or random polypropylene, ethylene-vinyl acetate copolymers, ethylene-vinyl alcohol copolymers, ionomers and modified forms of these resins from the viewpoint of moldability, from the additional viewpoint of gas impermeability, an ethylene-vinyl alcohol copolymer resin is used preferably. In addition, the thickness of the hot-melt layer can be 10 μm to 100 μm and is preferably 15 μm to 50 μm.

In the present invention, an ethylene-vinyl alcohol copolymer having high heat resistance is used particularly preferably for the hot-melt layer. Namely, the melting point of the ethylene-vinyl alcohol copolymer used here is preferably 150° C. or higher, more preferably 165° C. or higher and even more preferably 180° C. or higher. In addition, the oxygen permeability of the ethylene-vinyl alcohol copolymer used here at 25° C. and 90% RH is preferably 100 cc/m$^2$·24 hr·atm or less and more preferably 50 cc/m$^2$·24 hr·atm or less. In the case of using such a resin, permeation of gas from the sealed portion at high temperatures can be reduced, thereby making this preferable.

From the viewpoint of realizing both favorable extendability and gas impermeability, the ethylene content of the ethylene-vinyl alcohol copolymer is preferably 10 mol % to 60 mol %, more preferably 15 mol % to 50 mol % and even more preferably 25 mol % to 45 mol %. Furthermore, this ethylene content can be determined by nuclear magnetic resonance (NMR).

In addition, the degree of gelation of the ethylene-vinyl alcohol copolymer is preferably 90 mol % or more, more preferably 95 mol % or more and even more preferably 99 mol % or more from the viewpoint of enhancing gas impermeability. The upper limit thereof is preferably 100 mol % and more preferably 99.99 mol %. Furthermore, in the case the ethylene-vinyl alcohol copolymer used in the hot-melt layer is composed of two or more different types of ethylene-vinyl alcohol copolymers, their respective ethylene contents and degrees of gelation as calculated from the compounding weight ratio thereof are the ethylene content and degree of gelation of the compounded ethylene-vinyl alcohol copolymer.

A layer having high gas impermeability can be used for the barrier layer, and aluminum foil, aluminum-deposited plastic films, plastic films vapor-deposited with an inorganic material such as silicon oxide or a metal oxide such as aluminum oxide, plastic films coated with a gas impermeable composition such as polyvinyl alcohol or vinylidene chloride, ethylene-vinyl alcohol copolymer film, and films having gas impermeability such as MXD nylon film can be used. Aluminum foil is particularly preferable from the viewpoints of eliminating the formation of pinholes and ensuring gas impermeability for a long period of time. The thickness of the barrier layer can be 3 µm to 50 µm and is preferably 5 µm to 20 µm.

A resin film and/or sheet having superior mechanical, physical and chemical properties that demonstrates superior strength in addition to having superior heat resistance, moisture resistance, pinhole resistance and puncture resistance can be used for the protective layer. Specific examples thereof that can be used for the protective layer include tough films or sheets made of polyester-based resin, polyamide-based resin or polypropylene-based resin. The protective layer is laminated an order to enhance physical properties such as strength of the outer packaging material, the lamination order is not limited to that having the envelop on the outermost side, the protective layer can be interposed between the barrier layer and the hot-melt layer, and a plurality of protective layers can be provided. The thickness of the protective layer can be 10 µm to 50 µm and is preferably 10 µm to 30 µm.

<Application>

The vacuum thermal insulation material of the present invention is used in all types of heat retention applications requiring thermal insulation at a high temperature range of 50° C. or higher. For example, the vacuum thermal insulation material of the present invention can be used for thermal insulation of the roofs of automobiles and buildings (such as residential houses), building walls, building ceilings, building floors and of water tanks. In the case of electric vehicles in particular, since reducing the amount of electrical power consumed by the air-conditioner is important for reducing the load on the battery, or in other words, increasing the distance the vehicle is able to travel, use of the vacuum thermal insulation material of the invention of the present application is extremely useful. In addition, applications to building roofs or walls are useful for realizing building energy savings. In addition to these applications, the vacuum thermal insulation material of the present invention can also be similarly applied to floor heating systems, vending machines, unit bathrooms, bathtubs and bathtub covers, thermoses, refrigerators, cold storage rooms, cold storage vehicles and cooler boxes.

<Specific Examples>

The following provides an explanation of specific aspects of an ordinary vacuum thermal insulation material and the vacuum thermal insulation material of the present invention with reference to the drawings.

FIG. 1 depicts an example of an ordinary vacuum thermal insulation material Y and this vacuum thermal insulation material Y has a core material 2 sealed in an envelope 3. The envelope 3 comprises hot-melt layers 4, a barrier layer 6 and a protective layer 7, and a sealed portion 5 is formed by thermally fusing hot-melt layer 4 that faces each other at an end portion thereof.

Figure 2:
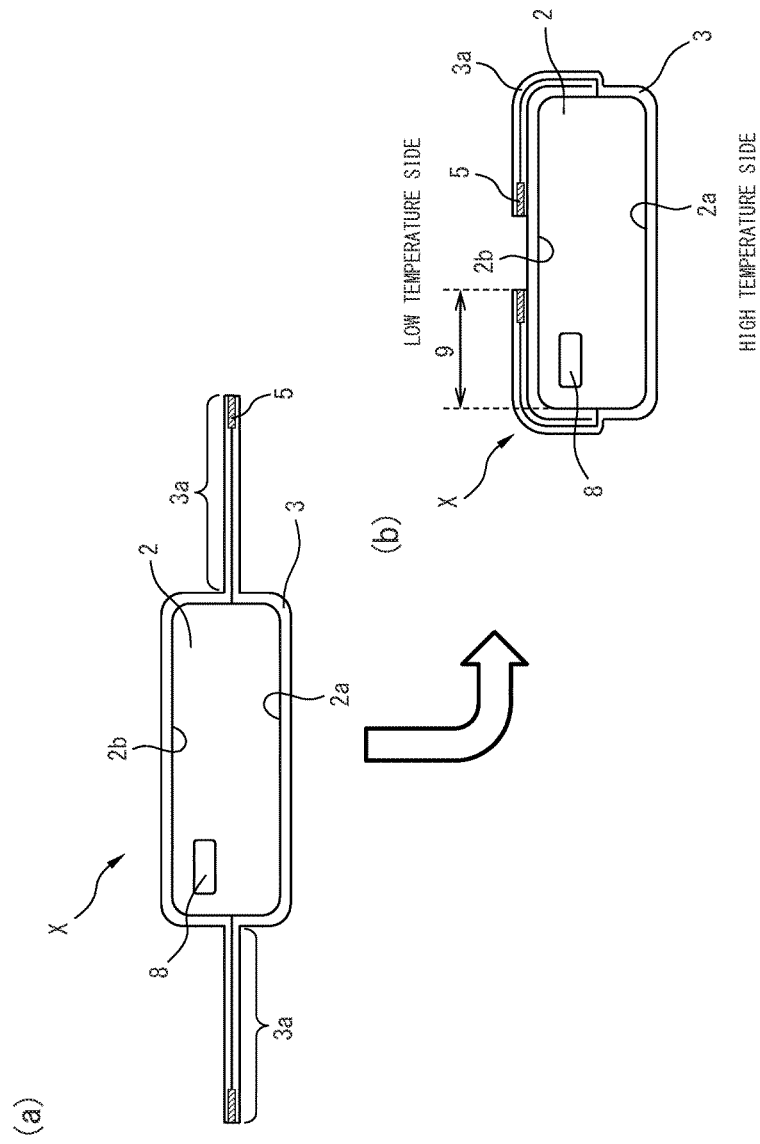
FIG. 2 indicates the manner in which the envelope is arranged in the vacuum thermal insulation material of the present invention.

FIG. 2 depicts an example of the vacuum thermal insulation material X of the present invention, and as shown in FIG. 2(b) that is a progression from FIG. 2(a), fin portions 3a of the envelope 3 are folded back at end surfaces of the core material 2 and the sealed portions 5 thereof are positioned on a second main flat surface 2b exposed to the low temperature side when in use. A length 9 of the folded portions of the envelope is the distance starting from an end surface of the core material to an end portion of the folded fin portion 3a. Here, the envelope 3 has an adsorbent 8 sealed inside together with the core material 2, and the core material 2 has a first main flat surface 2a exposed to the high temperature side and a second main flat surface 2b exposed to the low temperature side.

Figure 3:
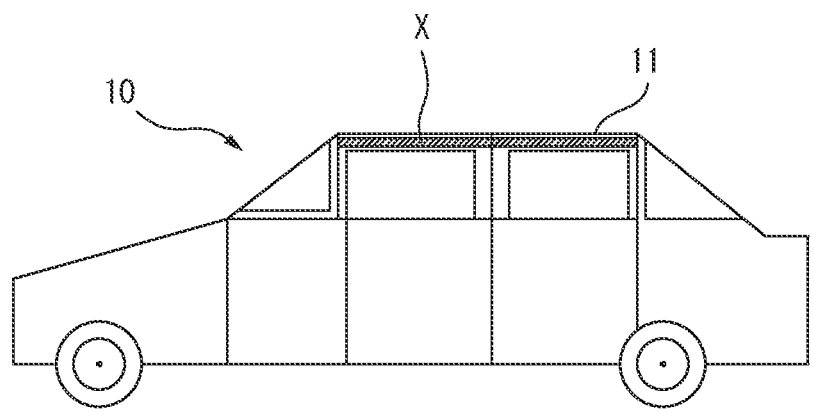
FIG. 3 indicates the manner in which the vacuum thermal insulation material of the present invention is used in an automobile.
Figure 4:
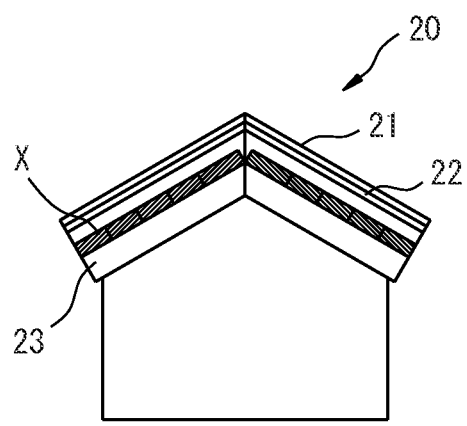
FIG. 4 indicates the manner in which the vacuum thermal insulation material of the present invention is used in a residential roof.
Figure 5:
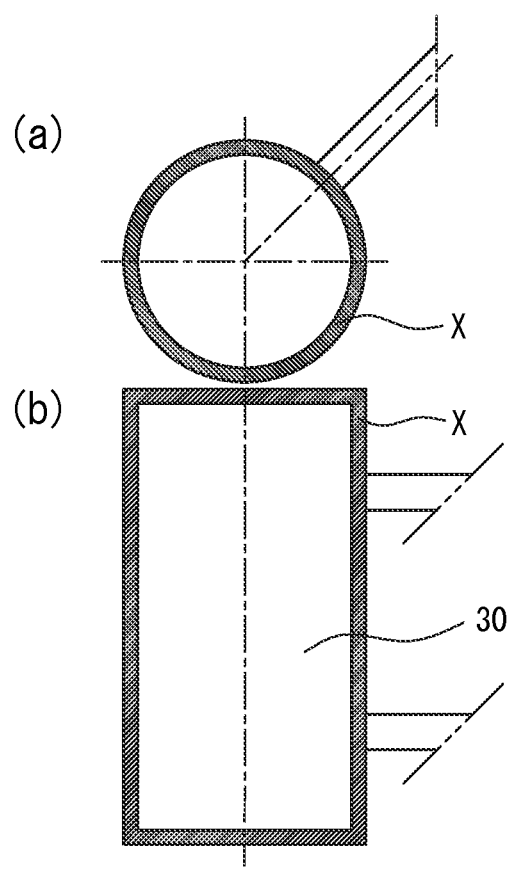
FIG. 5 indicates the manner in which the vacuum thermal insulation material of the present invention is used in a hot water tank.

FIGS. 3 to 5 depict the manner in which the vacuum thermal insulation material of the present invention is used. In FIG. 3, the vacuum thermal insulation material X of the present invention is used in a roof 11 of an automobile 10. Here, the sealed portion of the vacuum thermal insulation material, namely the second main flat surface, is positioned on the interior side of the automobile 10. Vacuum thermal insulation materials can also be similarly used at locations in the automobile other than the roof such as in the doors, floor or other separating walls. Since there is the risk of the vacuum thermal insulation material being damaged by the driver or passengers if the vacuum thermal insulation material is arranged on an inner surface of the automobile, it is preferably arranged between the interior material and automobile outer body. By preliminarily arranging the vacuum thermal insulation material on the opposite side from the interior side of automobile interior material, the vacuum thermal insulation material can be installed together with interior material during automobile production, thereby making it possible to add new value in the form of thermal insulation without having an effect on the production line while causing hardly any decrease in production efficiency.

In FIG. 4, although the vacuum thermal insulation material X of the present invention is used in the roof of a house 20, the vacuum thermal insulation material is inserted between a roof material 21 and roofing board 22 and rafters 23. Here, the sealed portion of the vacuum thermal insulation material is positioned or the inside of the house. In a building such as a residential house, although the vacuum thermal insulation material of the present invention is useful since the roof in particular reaches a high temperature due to the effects of sunlight in the same manner as an automobile, the vacuum thermal insulation material of the present invention can also be similarly applied at other sites such as walls or flooring by arranging the sealed portion on the opposite side from the side that reaches the highest temperature.

In FIG. 5, the vacuum thermal insulation material X of the present invention is used surrounding a not water tank 30.

Here, the sealed portion of the vacuum thermal insulation material is positioned on the outer side of the hot water tank. Since hot water tanks are typically cylindrical, in the case of attaching the vacuum thermal insulation material directly thereto, since a vacuum thermal insulation material having for the core material thereof a fibrous insulation material composed of glass wool and the like can itself be bent, it can be arranged while following the shape of the tank.

INDUSTRIAL APPLICABILITY

The vacuum thermal insulation material of the present invention is useful in all types of heat retention applications requiring thermal insulation at a high temperature range of 50° C. or higher. For example, the vacuum thermal insulation material, of the present invention can be preferably used as a vacuum thermal insulation material, for automobiles, residential house roofs and hot water tanks. In addition, it can also be similarly used in floor heating systems, vending machines, unit bathrooms, bathtubs and bathtub covers, thermoses, refrigerators, cold storage rooms, cold storage vehicles and cooler boxes.

BRIEF DESCRIPTION OF THE REFERENCE SYMBOLS

X Vacuum thermal insulation material of present invention
Y Conventional vacuum thermal insulation material
2 Core material
2a First main flat surface
2b Second main flat surface
3 Envelope
3a Fin portion
4 Hot-melt layer
5 Sealed portion
6 Barrier layer
7 Protective layer
8 Adsorbent
9 Length of fin folded portion
10 Automobile
11 Automobile roof
20 House
21 Roof material
22 Roofing board
23 Rafters
30 Hot water tank

The invention claimed is:

1. A vacuum thermal insulation material capable of being exposed at temperature of 40° C. or higher, and having a core material and an envelope in which the core material is inserted, wherein:
the envelope comprises a hot-melt layer, and the hot-melt layer at an end portion thereof is thermally fused to each other, thereby forming a sealed portion,
the core material has a first main flat surface exposed to the side which can reach the highest temperature when in use, and a second main flat surface that faces the first main flat surface and is exposed to the relatively low temperature side when in use, and
at least a portion of the sealed portion is positioned on the second main flat surface side, wherein the envelope is positioned on the second main flat surface side by being folded back at the end surface of the core material, and the length of the folded portion of the envelope is 10 mm to 100 mm starting from the end surface of the core material.

2. The vacuum thermal insulation material according to claim 1, wherein the envelope is positioned on the second main flat surface side by being folded back at the end surface of the core material, and the length of the folded portion of the envelope is 15 mm to 100 mm starting from the end surface of the core material.

3. The vacuum thermal insulation material according to claim 1, wherein the entire sealed portion is positioned on the second main flat surface side.

4. The vacuum thermal insulation material according to claim 1, wherein a plurality of sealed portions are formed in the envelope, and all of the plurality of sealed portions are positioned on the second main flat surface side.

5. The vacuum thermal insulation material according to claim 1, wherein an indication and/or coloring to the effect that the first main flat surface is used on the high temperature side and/or an indication or coloring to the effect that the second main flat surface is used on the low temperature side are present on the first main flat surface and/or on the second main flat surface.

6. The vacuum thermal insulation material according to claim 1, wherein the core material is a glass wool molding.

7. The vacuum thermal insulation material according to claim 1, wherein the hot-melt layer comprises an ethylene-vinyl alcohol copolymer resin.

8. The vacuum thermal insulation material according to claim 7, wherein the ethylene-vinyl alcohol copolymer resin has a melting point of 150° C. or higher.

9. The vacuum thermal insulation material according to claim 7,
wherein the ethylene content of the ethylene-vinyl alcohol copolymer resin is 10 mol % to 60 mol %.

10. The vacuum thermal insulation material according to claim 1, wherein the first main flat surface is exposed to a temperature of 40° C. or higher when in use.

11. The vacuum thermal insulation material according to claim 10, wherein the first main flat surface is exposed to a temperature of 60° C. or higher when in use.

12. The vacuum thermal insulation material according to claim 1, which is for use in an automobile, residential house roof or hot water tank.

13. The vacuum thermal insulation material according to claim 1 wherein the core material comprises a glass wool molding having a thickness of 10 mm to 20 mm.

* * * * *